United States Patent Office 2,734,883
Patented Feb. 14, 1956

2,734,883
PROCESS FOR PRODUCING BUTADIENE, STYRENE LATICES OF IMPROVED STABILITY

Stephen T. Bowell, Ian C. Rush, and William Harold Watson, Sarnia, Ontario, Canada, assignors to Polymer Corporation, Limited, Sarnia, Ontario, Canada, a corporation of Canada No Drawing. Application April 24, 1952,
Serial No. 284,204

Claims priority, application Canada December 1, 1951

6 Claims. (Cl. 260—29.7)

This invention relates to a method of manufacture of synthetic rubber latices by the emulsion polymerization of butadiene-1,3 and styrene. More particularly it relates to an improvement in the method of manufacture of such latices in polymerization reactions employing a saponifiable emulsifier together with a catalyst which yields acidic decomposition products during the course of the reaction.

Polymerization reactions employing saponifiable emulsifiers and catalysts yielding acidic decomposition products are commonplace in the commercial operations of synthetic rubber plants. Fatty acid soaps, rosin acid soaps or combinations thereof are typical of the emulsifiers employed. Sodium or potassium persulfate, the latter being normally preferred, are typical of the catalysts which on decomposition yield acidic products. It is well recognized by those familiar with the art that these particular catalysts decompose as the reaction proceeds to yield sulfuric acid. In the conventional method of charging a reactor the pH is adjusted to the range of 10.5 to 11.5 before the reaction is initiated. The reaction is then allow to proceed to the desired degree of conversion when the pH may be expected to have declined to the range of 8.0 to 8.4. Experiments indicate that in the early stages of the reaction the fall in pH values is quite rapid but in the later stages it is appreciably slower but nevertheless continuing as long as any unused catalyst remains in the reacting mass. Higher pH values are desirable to insure the stability of the latex and to meet the specifications the trade has established for that reason. Caustic potash, caustic soda or other alkaline material is therefore added to restore the pH to approximately 10.5. In the normal course of shipment or storage a decline in the pH may be expected, in some cases the material being below the specified pH 10. Moreover, a further adjustment in the pH may not be presumed to achieve permanent pH stability.

The obvious solution to the problem would be to increase the caustic charged at the commencement of the reaction. The disadvantages associated with such a practice are that the excessive caustic would prove too corrosive to the glass lining of the reactors to be tolerated and that the mercaptan consumption would be increased to an intolerable degree.

It was found that the incremental addition of alkaline material during the course of the reaction overcame these difficulties and resulted in the production of a latex product possessing enhanced pH stability. An unexpected advantage lies in the fact that the latex produced by the practice of this invention also possesses improved mechanical stability. A further unexpected advantage arises from the fact that a thin brown oily film, found on the latex produced by the previous practice, has not been found to occur in material produced in accordance with this invention.

In the application of this invention to commercial operations, the reactor is charged in accordance with a standard recipe employing a saponifiable emulsifier and a persulfate catalyst or other catalyst which on decomposition yields acidic products. The standard recipe is as follows: Butadiene 50 parts by weight, styrene 50 parts, rosin soap 5.5 parts, potassium persulphate 0.55 part, dodecyl mercaptan sufficient to give the desired Mooney viscosity and 115 to 125 parts of water. The pH is adjusted to approximately 11. The reaction is initiated and carried on in accordance with the practice well known in the art except that at intervals as the reaction proceeds, sufficient alkaline material is added as necessary to maintain the pH above the equivalence point of the emulsifier; that is the pH at which free rosin or fatty acid is formed from the soap. There are many ways in which the additions may be made. Technically, the continuous addition of alkaline material at a decreasing rate throughout the reaction is the most desirable. In practice, the addition at intervals as necessary has been found to be adequate. A variety of practices were tested and all proved satisfactory. Any practice which maintains the desired pH is operative and the convenience of the operation may be taken into consideration.

The reaction may be more readily explained by reference to the potassium persulfate catalyst and the rosin acid emulsifier. The progress of the reaction is known to be accompanied by a decomposition of the potassium persulfate and the resulting sulfuric acid causes a decrease in the pH of the reacting mass. What actually happens is this:

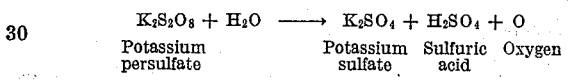

$$K_2S_2O_8 + H_2O \longrightarrow K_2SO_4 + H_2SO_4 + O$$

Potassium persulfate — Potassium sulfate — Sulfuric acid — Oxygen

The $H_2SO_4$ first neutralizes the free caustic in the mix then reacts with the soap releasing free rosin acid

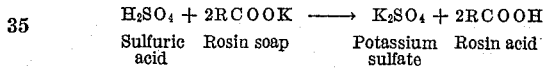

$$H_2SO_4 + 2RCOOK \longrightarrow K_2SO_4 + 2RCOOH$$

Sulfuric acid — Rosin soap — Potassium sulfate — Rosin acid

Only when the pH drops below the equivalence point of the emulsifier employed will free rosin acid be formed. Since the free rosin acid is not readily soluble in the water phase, it will be taken up by the dispersed polymer particles or globules. By experiment on a standard commercial recipe for the manufacture of (Rubber Reserve type IV) latex it has been determined that up to 35% of the emulsifier has been converted to free rosin acid by the time the reaction has been terminated.

By adjusting the pH after the reaction has been terminated the free rosin acid, probably being occluded in the polymer particles, is not immediately neutralized and after postreaction adjustment of the pH its gradual neutralization will result in a delayed decline in pH. This delayed decline in pH may occur while the material is in storage or in transit.

In the practice of this invention, the formation of free rosin acid is precluded by maintaining the pH of the reaction mass above the equivalence point of the emulsifier at all times. The resulting latex product has been found to retain a satisfactory pH value and to possess increased mechanical stability and to be free of the brown oily film frequently found on latices produced by conventional means.

The following examples, while not reflecting all the possible applications of the invention, do demonstrate the improvement over the previous practice as well as a preferred embodiment thereof:

EXAMPLE 1

A reactor batch containing equal parts by weight of butadiene and styrene and using five parts by weight of a rosin soap to produce approximately 3,500 gallons of latex was charged and polymerized in the normal manner. The pH at the start of the reaction was 11.0. At the end of the reaction, the pH had fallen to 8.2.

This is below the equivalence point of rosin soap, (which is about pH 9.7), and some free rosin acid will have formed. Potassium hydroxide solution was added to raise the pH to 10.5.

The total amount of 45% potassium hydroxide solution added before and after polymerization was 127½ pounds.

EXAMPLE 2

A similar reactor charge was run, this time adding 12 gallons of 4.5% caustic potash solution after the reaction had proceeded for two hours. A similar increment was added after the reaction had proceeded four hours and another after six hours. In this case, the pH of the latex was measured periodically and was as follows:

Table I

| Time of Samples, Hours after start | pH of Latex |
|---|---|
| 0 | –11.0 |
| 1 | 10.7 |
| 3 | 10.8 |
| 5 | 11.0 |
| 7 | 11.3 |
| 9 | 11.4 |
| 12 | 11.2 |
| 15 | 11.2 |
| 18 | 11.0 |
| 22 | 11.0 |

As can be seen, the pH of the latex did not go below the equivalence point of the emulsifier at any time in the reactions. The total amount of alkali added before, during and after polymerization was 140½ pounds calculated as a 45% solution of potassium hydroxide.

As can be seen, there were 13 pounds of 45% potassium hydroxide solution more added to the reactor in Example 2 than was added in Example 1. This is indicative of the fact that although the pH in Example 1 was brought up to the proper level, there still was free rosin acid present sufficient to neutralize a further 13 pounds of caustic potash solution. This rosin acid is neutralized by the caustic potash very slowly and eventually may resul in the pH of the latex being below specification. To have added this quantity arbitrarily would have, temporarily at least, increased the pH above the specification limit.

Further, the amount of free rosin acid varies from batch to batch, due to the fact that minor variations in reaction conditions or charging errors are greatly magnified into large differences of free rosin acid at the end of the reaction. For this reason, it is not possible to assume an amount of caustic that can be added to each charge to neutralize this free rosin acid. Consequently, the only way to ensure uniform pH conditions from charge to charge is by the increment addition of alkali during the reaction.

In Example 3 two runs are shown in which form increments of alkali were made.

EXAMPLE 3

A similar reactor charge was run with additions at 2, 4 and 6 hours of 4.5 lbs. KOH as 4% solution. Periodic tests were made after the third increment and an addition 4.5 lbs. of KOH was added when the pH dropped below 10.

Table II

| 3a | | | 3b | | |
|---|---|---|---|---|---|
| Hours | pH | increment, pounds | Hours | pH | increment, pounds |
| 2 | | 4.5 | 2 | | 4.5 |
| 4 | | 4.5 | 4 | | 4.5 |
| 6 | | 4.5 | 6 | | 4.5 |
| 7 | 10.0 | | 7 | 9.9 | 4.5 |
| 9 | 9.6 | 4.5 | 9 | | |
| 12 | 10.7 | | 12 | 11.4 | |

The latices produced as indicated in the examples were tested to determine their mechanical stability by using the High Speed mixer test generally accepted as indicative of the mechanical stability of latices.

Tests were conducted on many batches of latex. From each batch three 100-gram samples were taken, submitted to high speed agitation for twenty minutes, and filtered to determine the coagulum. Each batch of latex was appraised on the basis of the high, low and average coagulum determination. The mean high, mean low and mean average for all the batches were then determined and are set out in Table III.

Table III

COAGULUM FORMED BY 20 MINUTES' AGITATION IN THE HIGH SPEED MIXER

| | Latex prepared by Conventional Charging Method | Latex prepared by Increment Alkali Addition |
|---|---|---|
| | Grams | Grams |
| Average | 0.315 | 0.152 |
| High | 0.497 | 0.406 |
| Low | 0.165 | 0.019 |

The table demonstrates that in addition to improved pH stability a marked and unexpected improvement in the mechanical stability of the latex results from the practice of the invention.

It is expressly noted that a variation in the monomer charge ratio or any other variation in the recipe which is not associated with the emulsifier system of the reaction or with the catalyst system will have no bearing on the applicability of the invention.

We claim:

1. A process for making synthetic rubber latices by the emulsion polymerization of butadiene 1,3 and styrene in which the butadiene 1, 3 and the styrene are polymerized in the presence of rosin soap as a saponifiable emulsifier and a persulfate catalyst which on decomposition yields sulphuric acid, and in which alkaline material is added during the polymerization reaction to maintain the pH of the reaction mixture above the equivalence point of the rosin soap, namely, a pH of about 9.7.

2. A process as in claim 1 in which the alkaline material is added continuously during the polymerization reaction.

3. A process as in claim 1 in which the alkaline material is added at intervals during the polymerization reaction.

4. A process as in claim 1 in which the catalyst is selected from the group consisting of sodium persulfate, potassium persulfate and mixtures thereof.

5. A process as in claim 1 in which the alkaline material is selected from the group consisting of sodium hydroxide, potassium hydroxide and mixtures thereof.

6. A process for making synthetic rubber latices by the emulsion polymerization of butadiene 1, 3 and styrene in which the butadiene 1, 3 and the styrene are polymerized in the presence of a saponifiable emulsifier comprising rosin soap and a catalyst selected from the group consisting of sodium persulfate, potassium persulfate and mixtures thereof and in which additions of an alkaline material selected from the group consisting of sodium hydroxide, potassium hydroxide and mixtures thereof are made during the polymerization reaction to maintain the pH of the reaction mixture at a pH greater than the equivalence point of the rosin soap, namely, a pH of about 9.7.

References Cited in the file of this patent

UNITED STATES PATENTS

| 2,409,915 | Vanderbilt et al. | Oct. 22, 1946 |
| 2,546,244 | Tucker | Mar. 27, 1951 |
| 2,581,402 | Fryling | Jan. 8, 1952 |